June 7, 1960　　　R. H. NORRIS ET AL　　　2,939,386
END STAMPING DIE

Filed Dec. 12, 1955　　　　　　　　　　2 Sheets-Sheet 1

INVENTORS
Richard H. Norris
Carl O. Malmstrom
BY Harness, Dickey & Pierce
ATTORNEYS.

June 7, 1960  R. H. NORRIS ET AL  2,939,386
END STAMPING DIE
Filed Dec. 12, 1955  2 Sheets-Sheet 2
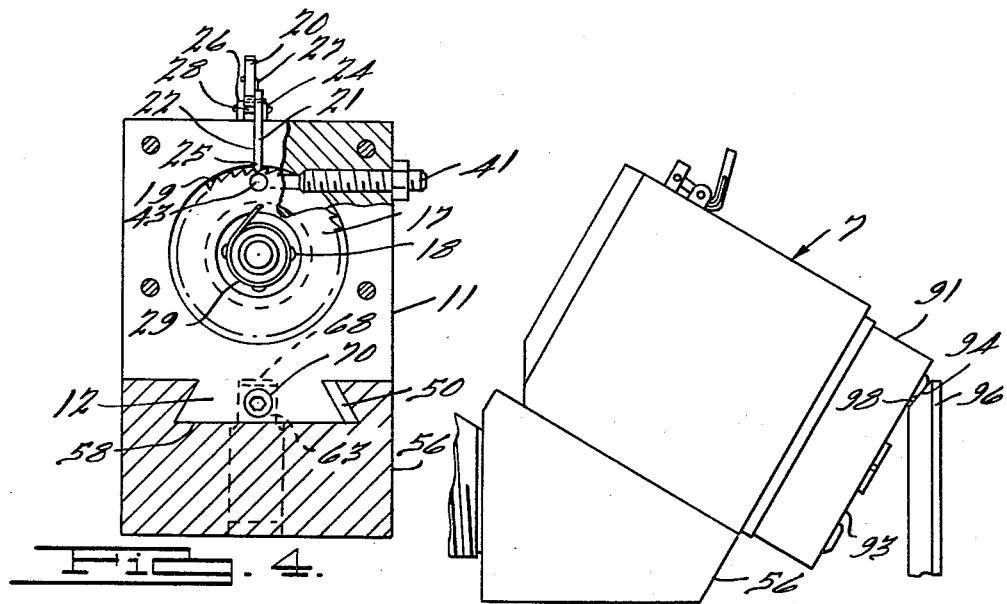
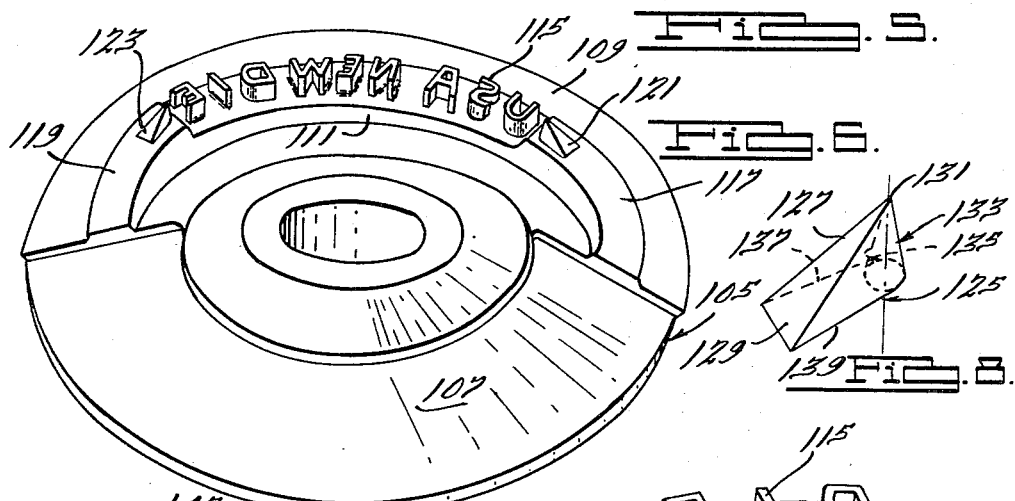
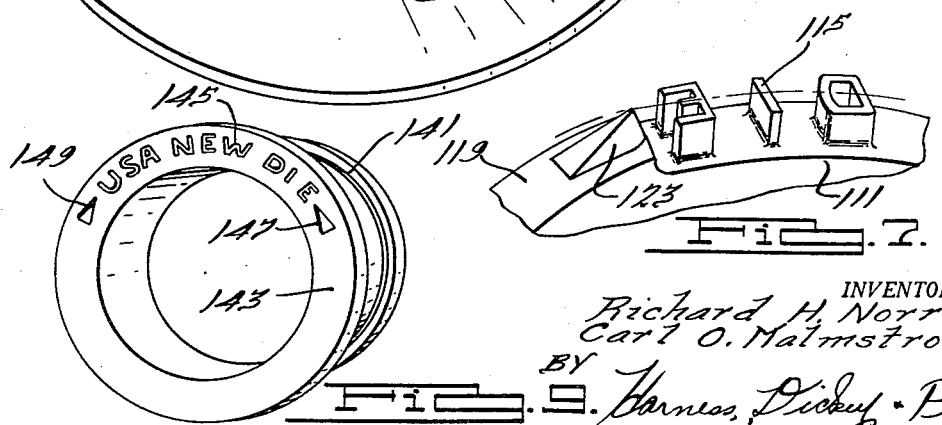
INVENTORS.
Richard H. Norris.
Carl O. Malmstrom
BY
Harness, Dickey & Pierce
ATTORNEYS United States Patent Office 2,939,386
Patented June 7, 1960

2,939,386

END STAMPING DIE

Richard H. Norris, Oak Park, and Carl O. Malmstrom, Detroit, Mich., assignors to New Method Steel Stamps, Inc., Detroit, Mich., a corporation of Michigan Filed Dec. 12, 1955, Ser. No. 552,634

5 Claims. (Cl. 101—28)

This invention relates to improvements in marking tools and to a novel die for marking indicia on machine parts while the same are being worked on, and to a novel combination of apparatus for carrying out such marking operations. More particularly the invention relates to a novel die for marking radial end faces of rapidly rotating workpieces while the same are being formed in automatic machines, to an improved marking tool for supporting the novel die, and to a novel combination of apparatus for performing radial end face marking of such workpieces.

In automatic machines which turn out parts at a rate of several thousand per hour per machine, it is not economically feasible to make the parts in one machine and then in a separate operation remount the parts in another machine for marking. It is known that peripheral marking tools and dies are capable of marking machine parts while the same are being produced in automatic machines, and in such operations the marking die has indicia on its periphery which it impresses on the periphery of the workpiece. In many instances it is not possible to mark the workpiece on its periphery while the workpiece is being rotatably driven and worked on in an automatic machine, as for example, where the workpiece does not have a substantial portion of its periphery which is arcuately shaped. In many other instances, it is not feasible to mark the workpiece on its periphery since the peripheral portions of the workpiece are oftentimes used for bearing surfaces, in which cases the bearing surfaces would be ruined if indicia were placed thereupon. It is advantageous then to mark indicia on a surface of a workpiece which is not its periphery, not only for the aforesaid reasons, but in other instances also, even where it is possible or feasible to mark on the periphery. An example of such an instance is where the indicia has functional purposes, e.g. to inform the user of a particular product wherein the workpiece or the machine part is employed of different settings or graduations and where it is important that these functional indicia be readily visible in the finished product.

The present invention overcomes these limitations by providing means to mark a workpiece with indicia on a radial end face rather than on its periphery. By "radial end face" of a die or workpiece is meant a frontal face thereof forward of the back surface of the die or workpiece which makes an angle with and the plane of which intersects the axis of rotation of the die or workpiece. A radial end face can be either perpendiclar to or at some other angle which intersects the axis of rotation of the workpiece, an example of the latter being a beveled face. Marking of indicia on a radial end face of the workpiece has been termed radial end marking or end marking to distinguish from peripheral marking which marks indicia on a surface of the workpiece parallel to the axis of rotation. As far as is known, it has not been possible heretofore to end mark indicia on rotatably driven workpieces while the same are being formed in automatic machines. It has been found that end marking presents far greater problems than peripheral marking because at each finite radius from the axis of rotation of the rotatably driven workpiece there is a different linear velocity of the workpiece and consequently end marking produces excessive wear on the die parts. Whereas peripheral dies are usable after thousands of marking operations, it has been necessary to design a special marking die for end marking which will have a comparable long life. Likewise, it has been necessary to design a special marking tool for use with the end marking die because the strain and vibration on the marking tool during an end marking operation is greatly in excess of that placed upon a peripheral marking tool. In addition to the problem of excessive wear on the marking die, there is the difficulty of securing clear impressions which not only must be legibly clear but they must be deeply impressed in the workpiece. It is important that deep impressions be formed in the workpiece since oftentimes the face of the workpiece is subsequently subjected to a finishing operation which would, in most cases, remove the indicia if it were not deeply impressed on the workpiece.

It is therefore an important object of the invention to provide a novel marking die which is specially designed for end marking rotatably driven workpieces while the same are being formed on automatic machines and which cushions the vibration shock when the same engages and releases the work so as to protect the indicia thereon from damage.

It is another object of the invention to provide a novel marking die for end marking rotatably driven workpieces while the same are being formed on automatic machines which so effectively protects the indicia embossed thereon from damage that it may be used many times over comparable in number to that now realized with peripheral marking dies.

It is another object of the invention to provide a novel marking die for end marking rotatably driven workpieces which deeply and clearly impresses indicia on radial end faces of the workpieces by uniquely easing the indicia on the die into and out of the workpieces so as to protect the indicia on the die.

It is still another object of the invention to provide a novel combination of apparatus whereby to mark indicia on radial end faces of a plurality of workpieces while rotatably driving and working on the same.

It is still another object of the invention to provide a novel combination of apparatus whereby to mark indicia on radial end faces of a plurality of workpieces while rotatably driving and working on the same and wherewith it is not essential that the machine parts have substantially arcuate cross sections.

It is another object of the present invention to provide a novel marking tool for end marking indicia on radial end faces of rotatably driven workpieces while the same are being formed on automatic machines and which is sugged and can absorb the shock and vibration from repeated marking operations.

It is another object of the present invention to provide a novel marking tool for end marking indicia on radial end faces of rotatably driven workpieces having means to rotatably support the marking die so that a radial end face thereof can be presented in parallel confronting relation to a radial end face of a rotatably driven workpiece.

The above and other objects and advantages of the present invention will become apparent during the course of the following description taken in conjunction with the accompanying drawings.

In the drawings forming a part of the specification and wherein like numerals are employed to designate like parts throughout the same:

Fig. 3 is a right side elevation of the marking tool of Fig. 2 with the marking die removed;

Fig. 4 is a vertical section taken substantially along the line 4—4 of Fig. 2;

Fig. 5 is a side elevation of the improved marking tool of Fig. 2 in combination with a modified form of a novel marking die shown associated with a beveled workpiece;

Fig. 6 is a perspective view of a novel marking die embodying the present invention;

Fig. 7 is a detailed enlarged view of certain parts of the novel marking die shown in Fig. 6;

Fig. 8 is an enlarged perspective view showing diagrammatically the detailed structure of a single pressure pad of the type employed on the novel marking die of the present invention; and Fig. 9 is a perspective view of a workpiece showing a radial end face that has been marked by a die of the type shown in Fig. 6.

Figure 2:
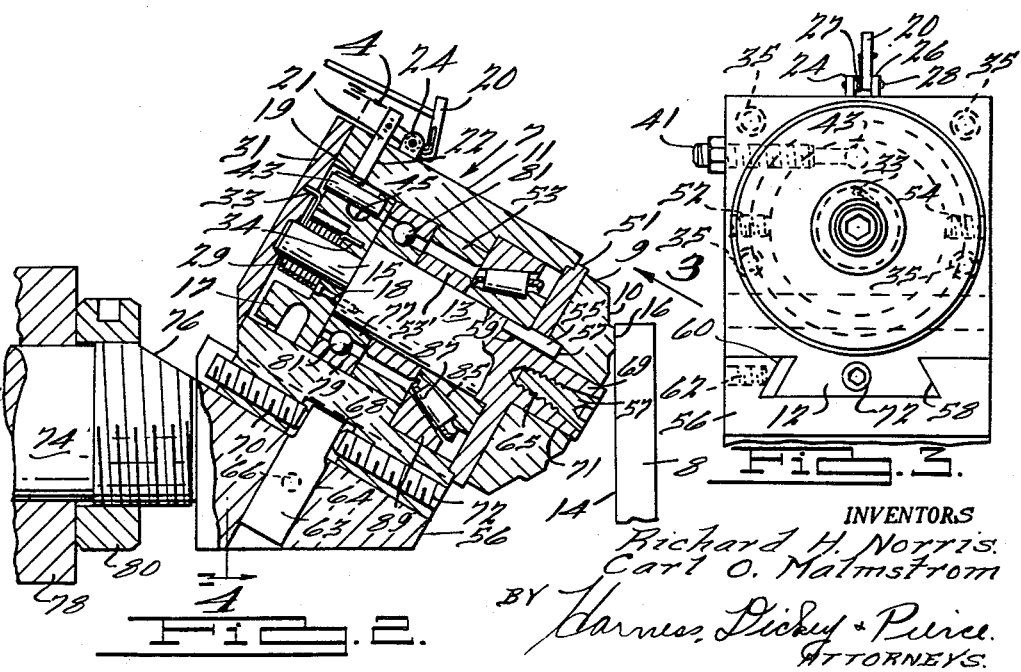
Fig. 2 is a side elevation partly in section of an improved marking tool and die shown associated with a workpiece.

Referring now in more detail to the figures, the marking tool is designated generally at 7, and as shown in Fig. 2 comprises an outer housing 11. Adapted to rotate within outer housing 11 is a central shaft 13. The central shaft 13 carries a marking die 9 on one end and has a shank portion 15 of reduced diameter at the other end. On the shank portion 15 is a ratchet disc 17 secured to the central shaft 13 by screws 18 and adapted to rotate therewith. The ratchet disc 17 has a plurality of serrations 19 about its periphery which are adapted to engage a pawl 21. The pawl 21 is adapted to reciprocate within a slot 22 in the housing 11 and has an obliquely cut end portion 25 which engages the serrations 19 on the ratchet disc 17. The manner of disposing the pawl in the housing affords a manner of sealing so as to keep dust and other foreign matter without the housing. Secured to the pawl 21 is a bell crank 20. The bell crank 20 pivots on a pin 28 supported by lugs 24, 26 which are affixed to the housing 11. A spring 27 is coiled about the pin 28 and is secured at one end to the bell crank 20 yieldably urging the latter to pivot about the pin 28 to urge the pawl 21 into engagement with the serrations 19 on the ratchet disc 17 to prevent rotation of the ratchet disc in one direction (in a clockwise direction as viewed from Fig. 4). Rotation of the ratchet disc 17 in the opposite direction (counter-clockwise as viewed in Fig. 4) is of course not prevented by the pawl 21, but rather the pawl 21 yieldably moves over the serrations 19 on the ratchet disc 17 when the latter is rotated in the latter direction.

Fitted about the shank portion 15 of the central shaft 13 is a helical spring 29 secured at one end to the back plate 31 for the housing 11 through an aperture 33 therein and at the other end thereof to the ratchet disc 17 by an aperture 34 therein. The back plate 31 is secured to the outer housing 11 by a number of bolts 35 or by other securing means. The helical spring 29 winds up during the marking operation and immediately following the marking operation it tends to return the marking die 9 to the original position, through its action on ratchet disc 17. Screw 41 extending outside of the housing 11 serves as an adjustable stop for the ratchet disc 17 to insure that the ratchet disc returns to its initial position after a marking operation. Adjustable stop 41 operates against a pin 43 disposed across an annular recess 45 in the outer peripheral portions of the ratchet disc 17. The pin 43 prevents further rotation of the ratchet disc 17 when it meets the adjustable stop 41. The marking die thus returns to its initial position ready for the next marking operation.

The marking die in Fig. 2 is shown with a beveled radial end face 10 having indicia 16 embossed thereon contacting a radial end face 14 of a workpiece 8, which is perpendicular to the axis of rotation of the workpiece. The end of the central shaft 13 carrying the marking die has formed integral therewith a flange 51 and projecting therefrom a stud portion 69 for engaging a central bore 71 on the marking die. Rotary force is imparted to the marking die by way of a drive pin 55 which is press-fitted into a hole 57 in the back face of the marking die 9 and in turn press-fitted into a mating hole 59 in the central shaft 13 and flange 51. The stud portion 69 of the central shaft 13 to which the marking die 9 is affixed is split by four equally spaced splits and has a threaded aperture 65 adapted to receive expanding screw 57 which threads into the central shaft 13 and spreads the segments on the stud portion 69 outward against the inner walls of the central bore 71 in the marking die 9. The operation of the expanding screw 57 and the segments on the stud portion 69 of the shaft 13 against the inner walls of the central bore 71 in the marking die 9 insures the secure retention of the marking die 9 on the stud portion 69. The flange 51 seals the front end of the marking tool and also serves as a backing plate for the marking die in which capacity it distributes the load to the bearings to be presently described.

To reduce friction between the rotatable central shaft 13 and the stationary housing 11 are ball bearings 81 secured in inner race 77 and outer race 79. Likewise, to reduce friction between rotatable central shaft 13 and stationary housing 11 and also to take up shock and vibration when the marking die 9 is forced against a rotatably driven workpiece 8 are roller thrust bearings 87 housed in inner cone race 85 and outer cone race 89. An outer bearing spacer 53 is held secure from axial movement by screws 52, 54 extending to the exterior of the stationary housing 11. An inner bearing spacer 53' is secured to the central shaft 13.

The stationary housing 11 is slidably engaged on a mounting bracket 56. The mounting bracket 56 has a dovetail way 58 in which the lower dovetail portion 12 of the mounting bracket slides. A gib 60 is employed in a well known manner together with set screw 62 to adjustably take up lateral play between the housing 11 and the mounting bracket 56. To adjust the axial position of the housing 11 on the mounting bracket 56 there is provided a pin 63 which is disposed in a bore 64 in the mounting bracket 56. Set screw 66 bears against the pin 63 to prevent movement of the latter. The pin 63 projects into a recess 68 in the lower dovetail portion 12 of the stationary housing 11. To adjust the position of the stationary housing 11 on the mounting bracket 56, the gib 60 is loosened and adjusting screws 70 and 72 are turned so as to move the housing 11 along the recess 68. The mounting bracket 56 has a shank 74 partly threaded as at 76. The shank 74 slidably engages a suitable shankholder 78 here shown as being a part of the automatic machine shown in Fig. 1. Collar nut 80 adjusts the shank 74 to the shankholder 78. The preferred mounting bracket is that shown and described, although any suitable mounting bracket can be employed in conjunction with the marking tool of the present invention.

Figure 1:
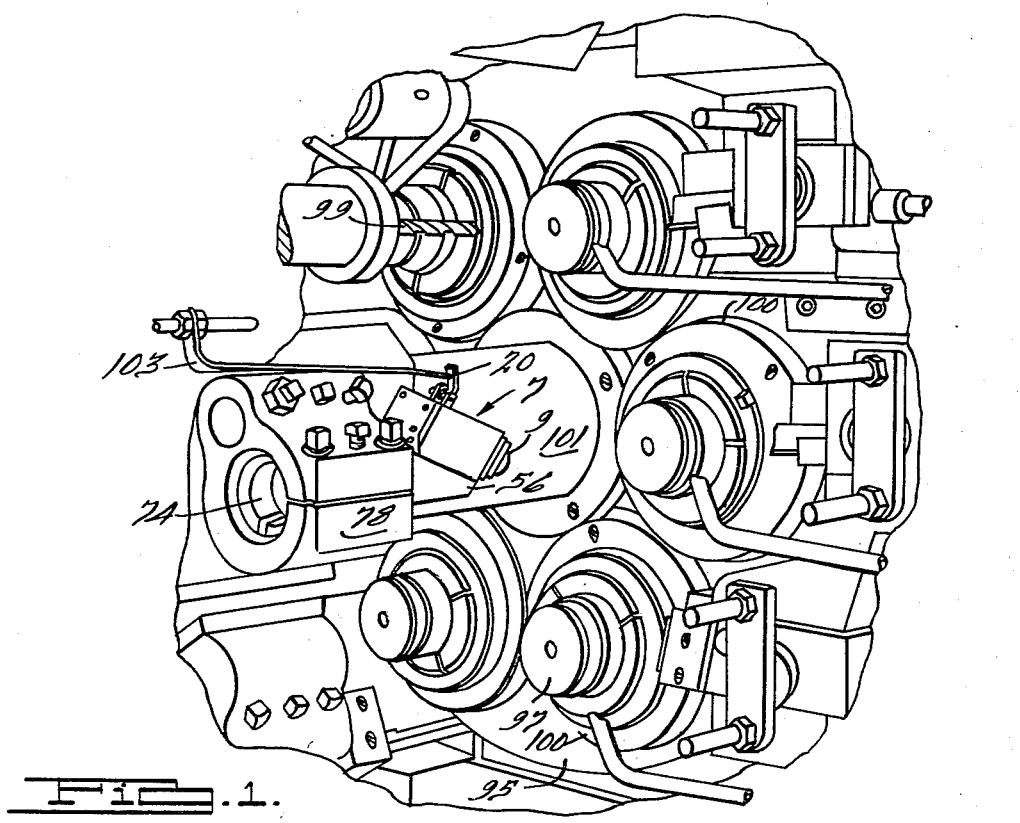
Figure 1 is a perspective view of an improved marking tool and die of the present invention mounted as one work station on an automatic screw machine.

Shown simply by way of environment in Fig. 1 is a perspective view of an automatic screw machine with the marking tool of the present invention mounted as one work station. It is apparent that the marking tool of the present invention may be used in conjunction with any of the innumerable types of machines. In the machine illustrated in Fig. 1 a master work spindle head 95 therein shown sequentially indexes the workpieces 97 with respect to the work stations where a number of different operations are performed. The automatic machine which may be employed in combination with the marking tool of the present invention may be of the type wherein the work-stations are indexed rather than the workpieces, or, it may be of the type where the workpieces are axially advanced to the work stations. The improved marking tool of the present invention is shown mounted at one such work station on the machine illustrated in Fig. 1. Another work station, by way of example, employs a drill bit 99 and is disposed as the next work station after the marking station. Disposed about the master work spindle head 95 are a plurality of work spindles 100 carrying workpieces 97. The workpieces 97 are advanced from one work station to another where different operations are performed on them while they are rapidly rotated about their own longitudinal axis. A main tool spindle 101 carries the plurality of work stations.

The shankholder 78 carrying the marking tool 7 is adapted for reciprocatory movement to and from the rapidly rotating workpieces 97 and reciprocates on the main tool spindle 101. On its return from the rapidly rotating workpieces 97, the marking tool 7 passes in proximity to a trip lever 103 mounted on a stationary part of the automatic machine. The trip lever 103 strikes the bell crank 20 and trips the same, releasing the pawl 21 to allow the ratchet disc 17 to rotate by the action of helical spring 29 to the position in which it was initially prior to the marking operation.

Fig. 4 shows in more detail the operation of the coaction between the ratchet disc 17 and the pawl 21. Assuming that in the view shown in Fig. 4 counterclockwise rotation of the ratchet disc 17 is that which occurs during a marking operation, the pawl 21 will then yieldably move over the serrations 19 on ratchet disc 17 and allow the same to freely rotate. During the marking operation, the rotation of ratchet disc 17 winds up helical spring 29 and stores energy therein. When the marking operation is finished, the spring 29 will attempt to unwind and rotate the ratchet disc in the opposite (clockwise) direction. Rotation of the ratchet disc in this direction will immediately be opposed by the obliquely cut end 25 on the pawl 21 which will jam with the serrations 19 on ratchet disc 17 and prevent it from rotating. This action serves an important function which will be hereinafter explained. The ratchet disc 17 will remain secure from rotation substantially immediately following the marking operation and during the withdrawal of the marking tool 7 from the work. After the marking tool is withdrawn from the work, the trip lever 103 trips the bell crank 20 in opposition to the urging of its spring 27 and thus raises the pawl 21 so that the ratchet disc 17 is free to rotate (in a clockwise direction as shown in Fig. 4) and return to its initial position (shown in Fig. 4) as predetermined by the adjustable stop 41. As previously explained, the adjustable stop 41 operates within the annular recess 45 of ratchet disc 17 and abuts against pin 43 disposed to bridge the annular recess so that a number of varied initial positions for the marking die can be predeterminedly set for the marking operation.

In Fig. 5 is shown a perspective view of the marking tool 7 of Fig. 2 carrying a modified form of a novel marking die 91 having a radial end face 93 which is perpendicular to the axis of rotation of the marking die. The radial end face 93 has indicia 94 embossed thereon for marking a workpiece 96 which has a beveled radial end face 98. This modified form of die is necessary for marking radial end faces on workpieces which make an angle with the axis of rotation of the workpiece.

Fig. 6 is a perspective view of a novel marking die 105 according to the present invention and Fig. 7 is an enlarged detailed view of certain parts of the same shown in mored etail. In the die shown, the radial end face on which the indicia is embossed is beveled, although it is apparent that it could be flat planar such as that shown by the die in Fig. 5. The only limitation being that it must be a radial end face, i.e. it must be a frontal face forward of the back surface of the die and it must make an angle with and be in a plane which intersects the axis of rotation of the die. The type of die shown in Figs. 6 and 7 is used on workpieces having flat planar radial end faces. The radial end face of the die shown in Figs. 6 and 7 is divided into two substantially equal areas. One of these areas 107 is recessed while the other, 109, is raised slightly with respect to the area 107.

A base 111 of narrow wides and of substantially trapezoidal cross section is raised from the surface of the raised area 109. The raised base 111 extends in an arcuate path from the beginning to the end of the slightly raised area 109. Embossed on the raised base 111 are suitable marking indicia 115, each letter of which extends upwardly from the raised base 111. The die has a starting cam 117 in front of and a releasing cam 119 behind the indicia 115 with respect to the direction of rotation of the die. Each of the cams 117 and 119 rises gradually from the surface of the slightly raised area 109 to a height slightly above the base of the letters embossed on the raised base 111. Each of the cams is provided at that portion adjacent to the indicia 115 with pressure pads, a pressure pad 121 being disposed on the starting cams 117 and a pressure pad 123 being disposed on the releasing cam 119. An enlarged view of a single pressure pad is shown in Fig. 8.

These pressure pads 121 and 123 serve a very important function in protecting the indicia embossed on the marking die. The employment of these pressure pads in combination with the starting and releasing cams have enabled end marking dies to have a useful life comparable to peripheral marking dies which is a remarkable achievement considering the excessive vibration shock to which end marking dies are subjected as compared to peripheral marking dies. The pressure pads serve a unique function in protecting the indicia embossed on the die and their structure and disposition on the working face of the die is very important. It is highly desirable that the engaging crest surface of these pressure pads rise in height and decrease in area toward the indicia and that the smallest area and greatest height of the engaging crest surface be adjacent the indicia while the greatest area and lowest height be remote from the indicia. The reason for this is that as the area decreases with the same force applied less pressure is required to force the pressure pad into the work, so that just prior to the time the indicia beings to engage or leave the work, the pressure pads ease the same into and out of the work due to the extremely low pressures developed in the area of the first few letters and the last few letters of the indicia by reason of the structure and disposition of the pressure pads. It is these beginning and last few letters which bear the brunt of the shock of engaging and leaving the work and which are the first to be damaged and it is the marring of these letters that is the principal cause of scraping of the marking die. It is important that the engaging crest surface of the pressure pads rises to a height equal at least to the plane in which the upper surface of the indicia lies.

The preferred construction of the pressure pad is shown in Fig. 8 and there it can be seen that the engaging crest surface 127 of the single pressure pad 125 diagrammatically depicted is of triangular shape such that its area decreases from its base 129 and rises in height so as to terminate in a apex 131 adjacent the indicia. The apex 131 lies in a plane equal in height at least to the height of the upper surface of the indicia. The body portion 133 which defines the flank engaging surfaces of the pressure pad is solid but to show its preferred construction, the elemental build-up of the pressure pad is illustrated. Preferably, the body portion 133 supporting the engaging crest surface 127 of the pressure pad is built up from a right circular cone 135, the longitudinal axis of which passes through the apex 131. The lines 137 and 139 are tangent to the base of the cone 135 and intersect the base 129 of the triangular engageing crest surface 127 of the pressure pad. The flank engaging surface of the body portion 133 below the apex 131 then, is preferably of semi-conical configuration to afford the maximum support for the apex 131 of the pressure pad. The other rearward engaging surfaces of the pressure pad extending down from the sides of the triangular forward engaging surface 127 are thereby defined and blend in with the conical configuration of the rearward engaging surface beneath the apex 131.

The pressure pad 121 on the starting cam 117 cushions the original vibration shock which otherwise occurs when the first few letters engage the rapidly rotating workpiece. It serves to ease these letters into the work and thus protects the indicia from damage. The pressure pad 123 on the releasing cam 119 cushions the vibration shock which otherwise occurs when the last few letters of the indicia are released from the workpiece, thereby easing the last few letters out of the rapidly rotating workpiece and thus preventing damage to the indicia. These pressure pads have unexpectedly increased the life of the marking die. The starting cam 117 is the first portion of the marking die to engage the rapidly rotating workpiece due to the angle at which the die is moved into position to mark the same. The angle is such that the radial end face of the marking die is parallel to the radial end face of the workpiece. The starting cam 117 builds up pressure against the workpiece and starts the die rotating at the same speed as the workpiece so that by the time pressure pad 121 engages the work, the die and workpiece are rotating at substantially the same speed. The pressure pad 121, experiencing the greatest pressure at the base of the engaging surface, digs into the rapidly rotating workpiece taking the original shock which would normally be placed upon the first few letters of the indicia and simultaneously "finds" the workpiece for the indicia. The shape of the engaging crest surface of the pressure pad 121 being as described progressively decreases the pressure experienced in the vicinity of the first few letters of the indicia, and these letters are thus smoothly eased into the rapidly rotating workpiece. As the marking die begins to disengage from the workpiece, pressure pad, 123, due to the configuration of its engaging crest surface, immediately decreases the pressure in the vicinity of these letters and thus smoothly eases the indicia out of the workpiece. There is a progressive build-up of pressure along the engaging crest surface of the pressure pad and absorption of shock as the die continues to rotate, the maximum pressure on the engaging surface of the pressure pad being applied at the widened base which leads to the surface of the releasing cam 119 as perhaps best shown in Fig. 7, the base of the pressure pad 123 is substantially equal in width to the height of the letters or other characters in the indicia 115. Only the pressure pad 123 on the releasing cam 119 is shown in Fig. 7 but it will be readily appreciated that the pressure pad 121 on the starting cam 117 is similarly shaped and that the same fundamental relationships exist between the pad 121 and the indicia 115. The releasing cam 119 experiences this pressure against the workpiece and gradually disengages the marking die therefrom and takes up the shock as it so does. The pressure pads and releasing cams also serve to protect the marking tool and the machine on which the marking die is used as they relieve strains and vibrations which otherwise would occur when the marking die is engaged or released from the workpiece. If these physical relationships are not maintained between the indicia 115 and the pressure pads 121 and 123 the efficacy of the pads to prevent damaging vibration in operation is materially reduced. The particular shape and size relationships of the pressure pads 121 and 123 cause them to displace substantially the same amount of material in the workpiece as the individual characters of the indicia 115. As a result the leading character is led smoothly and easily into the work and the trailing character is released smoothly and evenly from the work. In this manner damage to the die characters is eliminated and any tendency for the die to chatter or vibrate also is eliminated. Chatter or vibration reduces the die pressure on certain characters in the indicia 115. As a result, all of the characters are not pressed to a uniform depth in the work and if these is sufficient lost motion in the parts of the machine the die may even lose contact with the work. If the latter contingency occurs, the work frequency slides across the die scoring the work and damaging or even destroying some of the middle characters in the indicia.

After the marking die has rotated to a position where the releasing cam 119 has left the workpiece, the inertia of the marking die continues the rotation slightly against helical spring 29 so that the recessed surface 107 confronts the workpiece. By the coaction of the pawl 21 and the serrations 19 on the ratchet disc 17 as previously explained, the marking die remains in this position until it is retracted from the rapidly rotating workpiece. This retention of the marking die in a fixed position following the marking operation is important as it assures that no frictional contact will occur between the rapidly rotating workpiece and the marking die, thus preventing damage to the surface of the rapidly rotating workpiece. The recessed area 107 is maintained in confronting relation with the surface of the rapidly rotating workpiece. Recessed area 107 assures that there will be no contact after the marking operation between the die and the workpiece, thereby preventing scoring of the workpiece. If the marking die were allowed to continue to rotate it would bring the indicia around to again contact the workpiece and thus score the same. Likewise, if it were allowed to rotate in a reverse direction the indicia would scrape against the workpiece a second time and thus mar the workpiece.

Fig. 9 is a perspective view illustrative of a workpiece 141 having a radial end face 143 perpendicular to its longitudinal axis upon which has been marked indicia 145 by the type of die illustrated in Fig. 6. Impressions 147, 149 are made in the workpiece by the pressure pads on the marking die.

In operation, the marking tool 7 holding the marking die 9 is brought forward at an angle to forcefully engage a radial end face of a rapidly rotating workpiece. The angle is such that the radial end face of the die is maintained parallel to the radial end face of the workpiece. The radial end face of the workpiece to be marked may be perpendicular to its axis of rotation in which case it would be marked by the beveled die shown in Fig. 2, or it may be at an angle to such axis, in which case it would be marked by the die shown in Fig. 5 which has a flat planar radial end face. The marking tool transmits force to the marking die and by its unique design absorbs the reaction force developed between the marking die and the rapidly rotating workpiece. The starting cam 117 is the first portion of the marking die to engage the workpiece. Force is continued to be applied to the marking tool and this force is transmitted to the marking die against the workpiece by the starting cam so that the starting cam causes the marking die to rotate at substantially the same speed as the workpiece. The pressure pad 121 on the starting cam 117 digs into the workpiece and absorbs the shock and vibration which otherwise would be transmitted to the first few letters of the indicia. The letters comprising the indicia are gradually eased into the rapidly rotating workpiece by means of a progressively diminishing pressure and begin to mark the same with a very clear and deep impression while the marking die continues its rotation to the last few letters of the indicia. The pressure pad 123 then digs into the rapidly rotating workpiece and takes up the shock which would otherwise be placed on the last few letters of the indicia as the same are disengaged from the surface of the rapidly rotating workpiece. The disengagement of the last few letters of the indicia takes place with a greatly decreased pressure which progressively builds up until the releasing cam 119 is then brought to bear against the workpiece as the die nears the completion of its marking operation. The releasing cam 119 transmits the reaction force between the marking die and the workpiece to the marking tool near the end of the marking operation and gradually releases the marking die from the rapidly rotating workpiece.

Inertia carries the recessed portion 107 in confronting relation with the rapidly rotating workpiece and thus insures that the workpiece will not be marred by frictional contact with any portion of the marking die. During the rotation of the marking die from its initial contact with the workpiece at its starting cam to its release from the workpiece by its releasing cam, the helical spring 29 disposed about the reduced shank portion 15 of the central shaft 13 is tightened so that when the marking die is released from the workpiece the helical spring 29 tends to return the marking die to its initial position but is prevented from so doing by pawl 21, the obliquely cut end 25 of which engages the serrations 19 on ratchet disc 17 and holds the same against the urging of the helical spring 29. The coaction between the helical spring 29 and pawl 21 serves to hold the marking die in a fixed position after the marking operation so that only the recessed portion 107 confronts the surface of the rapidly rotating workpieces. This insures that the workpiece will not be marred or scored by any parts of the marking die after the marking operation has been completed. The marking die remains fixed in this position until the pawl 21 is tripped by the lever 103 secured on a stationary portion of the automatic machine when the marking tool is retracted from the workpiece. When the pawl is tripped by the lever 103, it allows the spring means 29 to rapidly unwind and return the marking die to its initial starting position.

The initial starting position to which the marking die is returned can be adjusted by means of the screw stop 41, so that a number of predetermined initial starting positions for the marking die can be realized if desired. The screw stop 41 is adjustable from the exterior of the outer casing 11 of the marking tool. Ball bearings 81 and roller thrust bearings 87 enable the main shaft 13 which carries the marking die to rotate within the outer housing 11 of the marking tool with a minimum of friction and also absorbs a considerable amount of the reaction force between the marking die and the rapidly rotating workpiece. The force applied to the marking tool in end marking operations greatly exceeds that used in peripheral marking operations and for this reason the marking tool must be able to withstand greatly increased shock and vibration. The preferred manner of securing the marking die to the main shaft as shown uniquely insures that the marking die will rotate with the main shaft as a unit and yet allows for quick change to other types of marking dies. This is a special advantage in marking operations as different marking dies are usually employed in different machine parts. When different machine parts are to be forced on automatic machines, the machine is shut down and a different set of tools are mounted and the marking die is also changed in the usual instance. The marking die can be easily disassembled from the marking tool of the present invention and a new one quickly attached and be secured thereto so that there is no danger of relative movement between the two.

It can thus be seen that there has been shown and described a marking tool which is especially suited for end marking rotatably driven workpieces, and which can withstand the shock and vibration from repeated marking operations. The marking tool of the present invention performs the difficult operation of radial end face marking without excessive wear on the marking die and gives a clear and deep impression without marring or scoring the workpiece. There has also been described a novel marking die especially suited for marking radial end faces of rotatably driven workpieces while they are being formed on automatic machines and which can be used many times over since it uniquely protects the indicia embossed thereon from damage. Radial end face marking is especially destructive of indicia on marking dies but the structure of the marking die of the present invention substantially eliminates this problem and has provided for long life of the indicia embossed thereon after many marking operations. The special features of the marking die shown and described are necessary for successful accomplishment of radial end face marking but could be used to advantage in peripheral marking. Finally, there has been described a novel combination of apparatus for marking indicia on radial end faces of rapidly rotating workpieces while forming the same which is not limited to workpieces having substantially arcuate cross sections and which provides for greatly increased economies in operation.

While the preferred embodiment of the invention has been shown and described, it is to be understood that various modifications, changes in size, shape and arrangement of parts may be resorted to without departing from the spirit of the invention or the scope of the appended claims.

What is claimed is:
1. A rotatable marking die for externally marking rotatably driven workpieces, said die provided with a radial end face adapted to be mounted in acute angular relation with respect to the surface to be marked, arcuately arranged marking characters embossed on said radial end face, a starting cam in front of said marking characters adapted to engage the work and to start the die rotating in unison with the work, a releasing cam behind said marking characters adapted to disengage the die from the work after the marking operation, and pressure pads on said starting and releasing cams extending flush with the tops of said marking characters and adapted to ease the marking characters into and out of the work.

2. A rotatable marking die adapted to be mounted on a machine of the type adapted to perform work on a workpiece for the purpose of externally marking workpieces in and rotatably driven by the machine, said die having a radial end face adapted to be mounted in acute angular relation with respect to the surface of the workpiece to be marked, marking characters embossed on said face, starting and releasing cams at opposite sides of said marking characters, said starting cam adapted to engage the work to start the die rotating in unison with the work, to build up pressure between the die and the work to determine the pitch penetration of the marking characters and to maintain the penetration pressure of said characters, said releasing cam adapted to disengage the die from the work, and work penetrating pads on said starting and releasing cams, the pad on said starting cam adapted to cushion the vibration shock which otherwise occurs when the first marking character engages the work and the pad on said releasing cam relieving the machine of strains and vibrations which otherwise occur as the die releases the workpiece.

3. A rotatable marking die adapted to be mounted on a machine for performing work on a workpiece for the purpose of externally marking workpieces in and rotatably driven by the machine, said die having a radial end face adapted to be mounted in acute angular relation with respect to the surface of the workpiece to be marked, marking characters embossed on said face, starting and releasing cams at opposite sides of said marking characters, said starting cam adapted to engage the work to start the die rotating in unison with the work, to build up pressure between the die and the work whereby to determine the pitch penetration of the marking characters and to maintain the penetration pressure of said characters, said releasing cam adapted to disengage the die from the work, and work penetrating pads on said starting and releasing cams, each of said pads having a triangular, sloping crest surface arranged with the apex thereof adjacent to said marking characters and receding gradually in height and increasing progressively in widths away from said marking characters, the pad on said starting cam adapted to cushion the vibration shock which otherwise occurs when the marking characters engage the work and the pad on said releasing cam relieving the machine of strains and vibrations which otherwise occur as the die releases the workpiece.

4. A rotatable marking die adapted to be mounted on a machine for performing work on a workpiece for the purpose of externally marking workpieces in and rotatably driven by the machine, said die having a radial end face adapted to be mounted in acute angular relation with respect to the surface of the workpiece to be marked, marking characters embossed on said face, starting and releasing cams at opposite sides of said marking characters, said starting cam adapted to engage the work to start the die rotating in unison with the work, to build up pressure between the die and the work whereby to determine the pitch penetration of the marking characters and to maintain the penetration pressure of said characters, said releasing cam adapted to disengage the die from the work, and work penetrating pads on said starting and releasing cams, each of said pads having a triangular, sloping crest surface receding gradually in height and increasing progressively in area along the length thereof in a direction away from said marking characters, the base width of said crest surface being substantially equal to the height of said marking characters, the pad on said starting cam adapted to cushion the vibration shock which otherwise occurs when the first marking character engages the work and the pad on said releasing cam relieving the machine of strains and vibrations which otherwise occur as the die releases the workpiece.

5. A rotatable marking die adapted to be mounted on a machine for performing work on a workpiece for the purpose of externally marking workpieces in and rotatably driven by the machine, said die having a radial end face adapted to be mounted in acute angular relation with respect to the surface of the workpiece to be marked, marking characters embossed on said face, starting and releasing cams at opposite sides of said marking characters, said starting cam adapted to engage the work to start the die rotating in unison with the work, to build up pressure between the die and the work whereby to determine the pitch penetration of the marking characters and to maintain the penetration pressure of said characters, said releasing cam adapted to disengage the die from the work, and work penetrating pads on said starting and releasing cams, each of said pads having a generally semiconical flank surface disposed adjacent to said marking characters and a triangular, sloping crest surface receding gradually in height and increasing progressively in area from said marking characters, the base of said crest surface being of substantially the same width as the height of said marking characters, and the axis of curvature of said flank surface passing substantially through the apex of said crest surface, the pad on said starting cam adapted to cushion the vibration shock which otherwise occurs when said marking characters engage the work, and the pad on said releasing cam relieving the machine of strains and vibrations which otherwise occur as the die releases the workpiece.

References Cited in the file of this patent

UNITED STATES PATENTS

| Number | Name | Date |
|---|---|---|
| 253,950 | Smith | Feb. 21, 1882 |
| 425,807 | Leach | Apr. 15, 1890 |
| 1,139,063 | Oster | May 11, 1915 |
| 1,258,215 | Heider | Mar. 5, 1918 |
| 1,490,709 | Pannier | Apr. 15, 1924 |
| 1,978,330 | Scholtes | Oct. 23, 1934 |
| 2,357,797 | Hauer | Sept. 12, 1944 |
| 2,370,184 | Nordquist | Feb. 27, 1945 |
| 2,399,397 | Simons | Apr. 30, 1946 |
| 2,417,865 | Douglass | Mar. 25, 1947 |
| 2,424,006 | Verrinder | July 15, 1947 |
| 2,610,576 | Norris | Sept. 16, 1952 |
| 2,676,534 | Norris | Apr. 27, 1954 |